Sept. 2, 1952  E. A. HAMACHER  2,609,144
SYSTEM FOR RECORDING X-RAY DIFFRACTION DATA
Filed Sept. 28, 1949
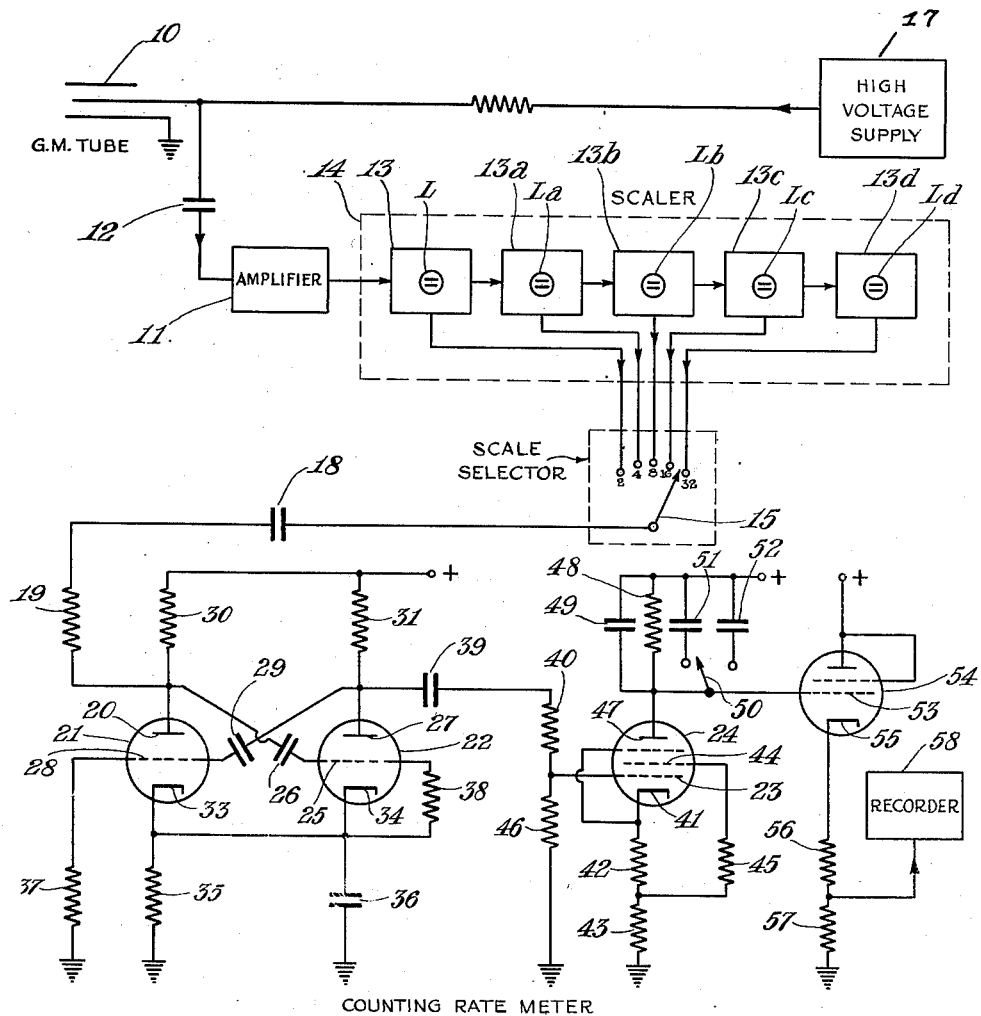
EDWARD A. HAMACHER
INVENTOR.
BY
Fred M. Vogel
AGENT.

Patented Sept. 2, 1952

2,609,144

UNITED STATES PATENT OFFICE 2,609,144

SYSTEM FOR RECORDING X-RAY DIFFRACTION DATA

Edward A. Hamacher, Irvington on Hudson, N. Y., assignor to Philips Laboratories, Inc., Irvington on Hudson, N. Y.

Application September 28, 1949, Serial No. 118,367

5 Claims. (Cl. 235—61)

The present invention relates to X-ray spectrometry, and more particularly to apparatus for indicating and recording X-ray diffraction data obtained with a Geiger-Mueller tube.

For making high speed and high precision measurements with a Geiger-Mueller tube, as in the measurement of spectral purity of X-ray tubes, it is advantageous to employ electronic circuits exhibiting flexibility and high stability and having a wide frequency range.

The principal object of the present invention is to provide an improved and efficient system for indicating and recording the data obtained with a Geiger-Mueller tube.

More specifically, it is an object of the present invention to provide indicating and recording apparatus affording an absolute reading of the random phenomenon yielded by a Geiger-Mueller tube as well as an indication of the rate at which the phenomenon is derived.

It is a further object of the present invention to provide in a system of the above type, a counting rate meter whose sensitivity may be maintained constant while its counting rate scale is adjusted through a wide range.

According to the invention, these objects are achieved by applying the output of a Geiger-Mueller tube to a scaler circuit having a plurality of scaling stages in cascade relation, each stage including an interpolation indicator, the respective stages being selectively coupled to a counting rate meter, a recording device being coupled to the output of the counting rate meter. By connecting the counter rate indicator to the stages of the scaler selectively, the counting rate meter is made to register any desired counting rate without entailing a variation in the sensitivity of the meter. The scaling stages in addition to dividing the rate of pulses applied to the counting rate meter also function to provide a direct reading of the number of pulses yielded by the Geiger-Mueller tube.

The invention will be described in greater detail with reference to the appended drawing which shows a schematic diagram of a circuit arrangement, in accordance with the invention, for indicating and recording the data obtained by a Geiger-Mueller tube.

Referring now to the drawing, there are shown the principal elements of the arrangement, according to the invention, including a Geiger-Mueller tube 10, a scaler 14, pulse quantitizing tubes 21 and 22, an integrating tube 24, a vacuum tube voltmeter 54 and a recorder 58. Geiger-Mueller tube 10 is coupled to an amplifier 11 through a capacitor 12. Direct current voltage is supplied to tube 10 from a high voltage supply 17. The output of amplifier 11 is fed to the first stage 13 of scaler circuit 14. The scaler circuit 14 is preferably of the type fully disclosed in my co-pending application (Serial No. 77,394, filed February 19, 1949, now Patent No. 2,557,186, issued June 19, 1951). For the purposes of the present application, it is sufficient to state that scaler circuit 14 comprises a plurality of stages of the Eccles-Jordan "flip-flop" type in cascade relation. Each of the successive stages, 13, 13a etc., acts as a binary scaler, producing a single output pulse for every two input pulses. By cascading the binary scaling stages the rate of occurrence of random phenomenon produced by Geiger-Mueller tube 10 can be scaled down to any desired point. In the arrangement shown, a maximum scaling ratio of 32:1 may be secured.

The fixed contacts 2, 4, 8, 16 and 32 of a multi-contact scale selector switch 15 having a movable contact are coupled, respectively, to the individual binary scaling stages 13 through 13d. This arrangement affords scaling ratios of 2, 4, 8, 16 or 32 by connecting the movable contact of the switch 15 to the appropriate fixed contact. Additional scaling ratios such as 64, 128 or 256 may be secured by adding additional scaling stages in cascade after stage 13d. The ratio of two input to one output pulse for any scaling stage may, of course, be altered. For instance, the scaling stages may be given decade relationships.

Each scaling stage is provided with an interpolation indicator in the form of a lamp L. These lamps, which may be neon lamps, serve two purposes. First, at low pulse rates they serve as a direct measure of the number of pulses that have passed to scaler 14 from Geiger-Mueller tube 10 up to a total of 31 pulses. A first pulse applied to scaler 14 actuates lamp L, a second pulse causing lamp L to be extinguished and lamp La to light. A third pulse causes lamp L to light and a fourth pulse causes lamps L and La to be extinguished and lamp Lb to light. It is seen, thus, that with all lamps lit, 31 pulses have been applied to scaler 14. A 32nd pulse would extinguish all lamps and prepare the scaler 14 for another cycle of operation. If scaler 14 were provided with eight binary stages, the associated lamps would indicate up to 255 pulses.

A secondary function of the interpolation lamps is to monitor the associated binary stages, faulty operation of any stage causing the corresponding lamp to become inoperative or to exhibit erratic behavior.

Tubes 21 and 22 form part of a pulse quantitizer circuit which serves to deliver pulses of constant charge content irrespective of counting rate to a grid 23 of tube 24, which tube is included in an integrating circuit. The pulse quantitizer circuit is coupled to a selected stage of the scaler 14 by means of a capacitor 18 and a resistor 19 connected in series between switch 15 and an anode 20 of tube 21.

The pulse quantitizer circuit is constituted by a multivibrator arrangement wherein anode 20 of tube 21 is coupled to a grid 25 of tube 22 through a capacitor 26, while anode 27 of tube 22 is coupled to a grid 28 of tube 21 through a capacitor 29. Anodes 20 and 27 are returned to a source of positive direct current potential through resistors 30 and 31 respectively. Cathodes 33 and 34 are connected together and coupled to ground through a biasing resistor 35 which is suitably bypassed by a capacitor 36. Grid 28 is returned to ground through a resistor 37, while grid 25 is returned to cathode 34 through a resistor 38.

In the quiescent condition, tube 21 is biased beyond cutoff by the voltage developed across biasing resistor 35. Tube 22, however, is conducting because the grid 25 and cathode 34 are coupled together through resistor 38. In operation, a negative pulse of voltage from scaler 14 applied to anode 20 and grid 25 causes the anode voltage of tube 22 to increase, initiating a regenerative switching action and rendering tube 22 non-conducting and tube 21 conducting. When the negative charge on capacitor 26 leaks off sufficiently, a reverse switching action occurs, rendering tube 22 conducting and tube 21 non-conducting. Thus for each application of a negative pulse, the pulse quantitizer circuit produces a single positive output pulse at anode 27. The duration and magnitude of these positive pulses are substantially independent of the negative pulse charge content because the negative pulses serve only to initiate the multivibrator action.

The positive pulses developed at anode 27 are applied to a grid 23 of integrator tube 24 through capacitor 39 and resistor 40. Cathode 41 of tube 24 is coupled to ground through a series combination of resistors 42 and 43. Screen grid 44 is coupled to the junction of resistors 42 and 43 through a resistor 45. Grid 23 is returned to ground through a resistor 46. Anode 47 of tube 24 is connected to a source of positive direct current potential through a resistor 48.

A capacitor 49 is connected in parallel with resistor 48. Integrator tube 24 is biased beyond cutoff by the voltage drop across resistors 42 and 43. A positive voltage pulse applied to grid 23 causes a pulse of current to flow into capacitor 49. Since each of the positive voltage pulses has the same duration and magnitude, the current pulses flowing into capacitor 49 have equal durations and magnitudes and the voltage across capacitor 49 will be proportional to the number of pulses stored therein. If, at the end of an interval, $n$ pulses have been stored in capacitor 49, the voltage, V, across capacitor 49 will be simply:

$$V = \frac{1}{C}(nq)$$

where "C" represents the capacity of capacitor 49, "$n$" represents the total number of pulses and "$q$" the charge per pulse (which is constant).

Capacitor 49 is, however, shunted by resistor 48 and will tend to discharge through resistor 48. The voltage across capacitor 48 thus indicates the average rate of arrival of pulses $$\frac{dn}{dt}$$

and will be given by the relationship:

$$V = (qR)\left(\frac{dn}{dt}\right)$$

where R is the resistance of resistor 48.

In order to adjust the time constant of the parallel circuit formed by capacitor 49 and resistor 48, additional capacity may be inserted in parallel therewith. This arrangement is shown with switch 50 connected so as to include either capacitor 51 or capacitor 52 in parallel with capacitor 49.

The voltage across capacitor 49, which voltage is proportional to the pulse rate, is applied to a grid 53 of tube 54 which is connected as a vacuum tube voltmeter. Coupled between cathode 55 of tube 54 and ground is a series combination of resistors 56 and 57, the voltage developed across resistor 57 being applied to recorder 58, which may be of the strip chart type, as for example the well known "Esterline Angus" recorder. In place of a strip chart recorder, a D.-C. meter may be employed to give a reading which may be directly calibrated in terms of pulse rate.

The pulse rate corresponding to full scale deflection of the meter or recorder is directly equal to the full scale sensitivity of the meter or recorder in counts per second multiplied by the scaling ratio corresponding to the setting of switch 15. In a preferred embodiment of the invention, the recorder employed has a full scale sensitivity of 1 ma. corresponding to 30 counts per second. Assuming switch 15 to be connected to terminal 32, the pulse rate at full scale deflection of the recorder is 32 times 30 or 960 pulses per second.

It is important to note that the frequency range of the counting rate meter may be varied over a wide range, without altering the meter sensitivity, merely by adjusting the switch 15 to include the appropriate number of cascade scaling stages between Geiger-Mueller tube 10 and the counting rate meter. For instance, if the meter is adjusted so that full scale deflection of recorder 58 will occur at a counting rate of 60 counts per second with switch 15 on contact 2, full scale deflection may be changed to 960 counts per second by adjusting switch 15 on contact 32. This change in no way affects the meter sensitivity because there is no change in the number of negative pulses applied to grid 26 which will cause full scale deflection of recorder 58.

While I have described my invention in a specific use thereof and in a specific embodiment, I do not wish to be limited thereto, for obvious modifications will occur to those skilled in the art without departing from the spirit and scope of the invention.

What is claimed is:

1. In a system for indicating X-ray diffraction data, the combination comprising a scaler for counting input pulses and constituted by a plurality of scaling stages provided with indicating means and connected in cascade relation; means to apply input pulses to the first of said scaling stages, pulse integrating means to develop an electrical quantity proportional to an applied pulse rate, means to selectively couple each of said scaling stages to said integrating means, and an indicating device coupled to said integrating means and responsive to said electrical quantity, said device having a predetermined full scale sensitivity, the pulse rate corresponding to a full scale reading of said device being equal to the full scale sensitivity thereof in counts per second multiplied by the scaling ratio corresponding to the setting of said selective means.

2. In a system for indicating X-ray diffraction data, the combination comprising a scaler for counting input pulses and constituted by a plurality of scaling stages provided with indicating means and connected in cascade relation, means to apply input pulses to the first of said scaling stages, pulse quantitizer means to develop output pulses having a substantially constant magnitude and duration, means to selectively coupled each of said scaling stages to said pulse quantitizer means, pulse integrating means to develop a voltage proportional to an applied pulse rate and coupled to said pulse quantitizer means, and an indicating device coupled to said integrating means and responsive to said voltage, said device having a predetermined full scale sensitivity, the pulse rate corresponding to a full scale reading of said device being equal to the full scale sensitivity thereof in counts per second multiplied by the scaling ratio corresponding to the setting of said selective means.

3. In a system for indicating X-ray diffraction data, the combination comprising a scaler for counting input pulses and constituted by a plurality of scaling stages provided with indicating means and connected in cascade relation, means to apply input pulses to the first of said scaling stages, pulse quantitizer means to develop output pulses having a substantially constant magnitude and duration, means to selectively couple each of said scaling stages to said pulse quantitizer means, pulse intergrating means to develop a voltage proportional to an applied pulse rate and coupled to said pulse quantitizer means, a vacuum tube voltmeter coupled to said integrating means, and an indicating device coupled to said vacuum tube voltmeter and responsive to said voltage, said device having a predetermined full scale sensitivity, the pulse rate corresponding to a full scale reading of said device being equal to the full scale sensitivity thereof in counts per second multiplied by the scaling ratio corresponding to the setting of said selective means.

4. In a system for indicating X-ray diffraction data and including a Geiger-Mueller tube, the combination comprising a scaler for counting random input pulses derived from said Geiger-Mueller tube and constituted by a plurality of binary scaling stages connected in cascade relation, each of said stages being provided with indicating means, means to apply random input pulses to the first of said binary scaling stages, pulse quantitizer means to develop output pulses having a substantially constant magnitude and duration, means to selectively couple each of said scaling stages to said pulse quantitizer means, pulse integrating means to develop a voltage proportional to an applied pulse rate and coupled to said pulse quantitizer means, and an indicating device coupled to said integrating means and responsive to said voltage, said device having a predetermined full scale sensitivity, the pulse rate corresponding to a full scale reading of said device being equal to the full scale sensitivity thereof in counts per second multiplied by the scaling ratio corresponding to the setting of said selective means.

5. In a system for indicating X-ray diffraction data and including a Geiger-Mueller tube, the combination comprising a scaler for counting random input pulses derived from said Geiger-Mueller tube and constituted by a plurality of binary scaling stages connected in cascade relation, each of said stages being of the Eccles-Jordan type and being provided with an interpolation indicating lamp, means to apply random input pulses to the first of said binary scaling stages, pulse quantitizer means to develop output pulses having a substantially constant magnitude and duration, switch means to selectively couple each of said scaling stages to said pulse quantitizer means, pulse integrating means to develop a voltage proportional to an applied pulse rate and coupled to said pulse quantitizer means, and a recording device coupled to said integrating means and responsive to said voltage, said device having a predetermined full scale sensitivity, the pulse rate corresponding to a full scale reading of said device being equal to the full scale sensitivity thereof in counts per second multiplied by the scaling ratio corresponding to the setting of said selective means.

EDWARD A. HAMACHER.

REFERENCES CITED

The following references are of record in the file of this patent:

UNITED STATES PATENTS

| Number | Name | Date |
| --- | --- | --- |
| 2,162,412 | Victoreen | June 13, 1939 |
| 2,374,248 | Tuttle | Apr. 24, 1945 |
| 2,519,184 | Grosdoff | Aug. 15, 1950 |
| 2,521,774 | Bliss | Sept. 12, 1950 |
| 2,521,789 | Grosdoff | Sept. 12, 1950 |

OTHER REFERENCES

"Design and Operation of an Improved Counting Rate Meter", Kip, Bousquet et al., R. S. I.; vol. 17, No. 9; Sept. 1946, pages 323–333 incl.

"A Vacuum Tube Circuit For Scaling Down Counting Rates"; Stevenson and Getting, Review of Scientific Instruments; R. S. I.: vol. 8, Nov. 1937; pages 414–416, incl.

"Circuits for the Control of Geiger-Mueller Counters and for Scaling and Recording their Impulses"; R. S. I.; vol. 9, July 1938, pages 218–22, incl. by T. H. Johnson.

"A Triode Vacuum Tube Scale of Two Circuits"; R. S. I.; Review of Scientific Instruments; vol. 9, March 1938, pages 83–89, incl. by Lifschutz and Lawson.

"Electronic Instruments for Use with Geiger-Mueller Tubes"; Ghelardi et al.; Nucleonics, vol. 1, No. 1; Sept. 1947, pages 50–59, incl.

"The Model 200 Pulse Counter" Higinbotham et al., Review of Scientific Instruments, vol. 18, No. 10; Oct. 1947, pages 706–714, incl.